United States Patent [19]
Kim

[11] Patent Number: 5,803,482
[45] Date of Patent: Sep. 8, 1998

[54] SHOCK ABSORBER FOR AUTOMOTIVE SUSPENSION

[75] Inventor: Ki-Won Kim, Kyungsangnam-do, Rep. of Korea

[73] Assignee: Hyundai Motor Company, Seoul, Rep. of Korea

[21] Appl. No.: 715,839

[22] Filed: Sep. 26, 1996

[30] Foreign Application Priority Data

Sep. 30, 1995 [KR] Rep. of Korea ...................... 95-33189

[51] Int. Cl.⁶ .................................................. B60G 21/00
[52] U.S. Cl. .......................................... 280/703; 280/714
[58] Field of Search .................................. 280/703, 714; 188/275, 279, 293

[56] References Cited

U.S. PATENT DOCUMENTS

| 3,537,715 | 11/1970 | Gualdoni | 280/703 |
| 3,810,650 | 5/1974 | Hudson | 280/703 |
| 4,625,985 | 12/1986 | Nakano et al. | 280/703 |
| 4,743,045 | 5/1988 | Yoshida | 280/703 |
| 4,826,205 | 5/1989 | Konda et al. | 280/703 |

*Primary Examiner*—Kenneth R. Rice
*Attorney, Agent, or Firm*—Finnegan, Henderson, Farabow, Garrett & Dunner, L.L.P.

[57] ABSTRACT

This invention is directed to a shock absorber for preventing the dive of the front and rear end of the vehicle body including a piston, a cylinder having first and second hydraulic fluid chamber divided by the piston; a hydraulic fluid passage for communicating the first and second hydraulic fluid passages with each other; and a device for increasing flowing resistance of fluid flowing along the hydraulic fluid passage when the front end of the vehicle body dives by abrupt braking force or the rear end of the vehicle body squats by abrupt accelerating force, thereby minimizing the vehicle's down.

3 Claims, 5 Drawing Sheets

SHOCK ABSORBER FOR AUTOMOTIVE SUSPENSION

BACKGROUND

The present invention relates to a shock absorber for an automotive suspension.

Generally, an automotive suspension connects an axle shaft and a vehicle body to each other and absorbs vibrations and impacts from road surfaces while the vehicle is being operated so that safety of a vehicle, and improved riding comfort can be obtained. To absorb impacts, an automotive suspension should be flexibly connected vertically, and to ensure driving force, braking force and centrifugal force during a vehicle's turning, which are generated at the wheel, an automotive suspension should be horizontally connected firmly.

Impacts and vibrations are generally absorbed by a shock absorber disposed between the vehicle body and a wheel carrier.

The shock absorber cannot prevent dive of the front and rear end of the vehicle body which occurs by sudden braking and driving force. That is, when the vehicle abruptly starts, the rear end of the vehicle body squats and when the vehicle abruptly stops, the front end of the vehicle body dives. This deteriorates riding comfort and can cause big car accidents.

For the foregoing reasons, there is a need for a shock absorber that can prevent the dive of the front and rear end of the vehicle body.

SUMMARY

The present invention is directed to a shock absorber that satisfies this need. The shock absorber for preventing the dive of the front and rear end of the vehicle body comprises a piston; a cylinder divided into first and second hydraulic fluid chambers by the piston; a hydraulic fluid passage for communicating the first and second hydraulic fluid passages with each other; and means for increasing flowing resistance of fluid flowing along the hydraulic fluid passage when a front end of a vehicle body dives by sudden braking force or a rear end of a vehicle body squats by sudden accelerating force, thereby minimizing the vehicle's dive or squat.

According to one aspect of the present invention, the means comprises a valve having a valve body vertically formed so as to be an integral part of the cylinder and a valve chamber formed within the valve body, and a valve spool disposed within the valve chamber and biased by an elastic member, the valve body being provided with at least one bypass fluid passage bypassing the hydraulic fluid passage and having a smaller passage diameter than that of the hydraulic fluid passage, whereby when the front or rear end of the vehicle body dives or squats by sudden braking or accelerating force, the valve spool is displaced by inertia force such that the hydraulic fluid passage is closed and the bypass fluid passage is opened, whereby the fluid flows by the decending action of the piston through the bypass fluid passage while increasing flowing resistance thereof to minimize the vehicle's dive and squat.

According to one other aspect of the present invention, the valve is further provided with a hydraulic fluid passage connected with the valve chamber.

According to still another aspect of the present invention, the valve spool comprises a first land having a first circumferential fluid passing groove and a face on which hydraulic fluid flowing along one bypass passage acts, and a second land having a second circumferential fluid passing groove and a face on which hydraulic fluid flowing along the other bypass passage acts.

BRIEF DESCRIPTION OF THE DRAWINGS

These and other features, aspects, and advantages of the present invention will become better understood with regard to the following description, appended claims, and accompanying drawings where:

DESCRIPTION

Reference will now be made in detail to the present preferred embodiment of the invention, an example of which is illustrated in the accompanying drawings. Wherever possible, the same reference numbers will be used throughout the drawings to refer to the same or like parts.

Figure 1:
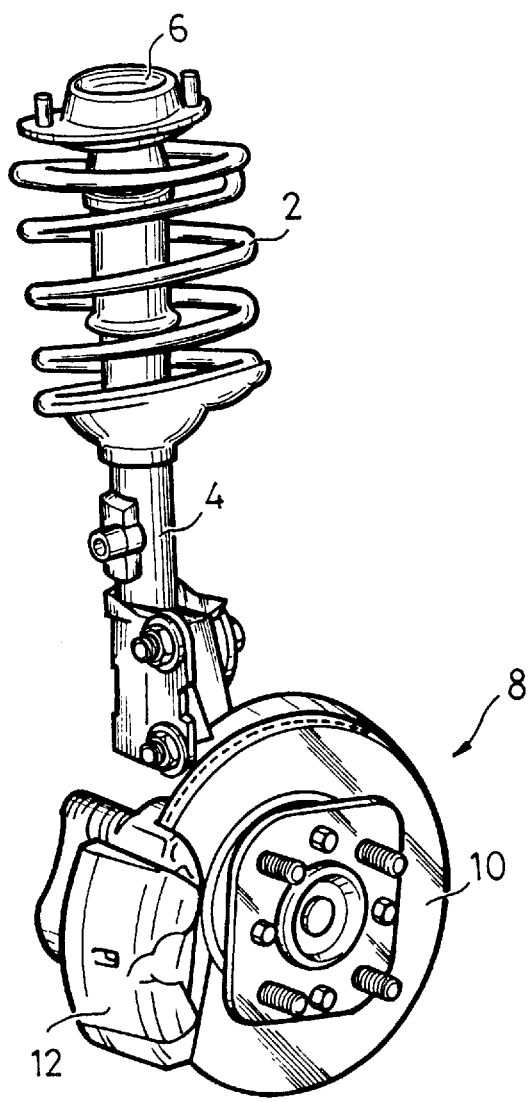
FIG. 1 is a perspective view of an assembly of a strut assembly and a wheel carrier where a shock absorber according to a preferred embodiment of the present invention is applied.

FIG. 1 shows an assembly of a strut assembly and a wheel carrier, where a shock absorber according to a preferred embodiment of the present invention is applied. The strut assembly is, as is well known, comprised of a spring 2 and a shock absorber 4. The upper end of the strut assembly is suspended on a vehicle body by interposing an insulator 6 therebetween, and the lower end thereof is integrally connected with the wheel carrier 8.

Further, the wheel carrier 8 is provided with a brake disk 10 and a calliper 12 for the braking operation of the wheel.

Therefore, when the vibration and impact are transmitted to the vehicle body through the wheel, these are absorbed by the shock absorber 4 and spring 2 so that vibration and impact are decreased.

In the present invention, the shock absorber 4 is designed to control hydraulic fluid flowing along its longitudinal direction during its up-down operation.

Figure 2:
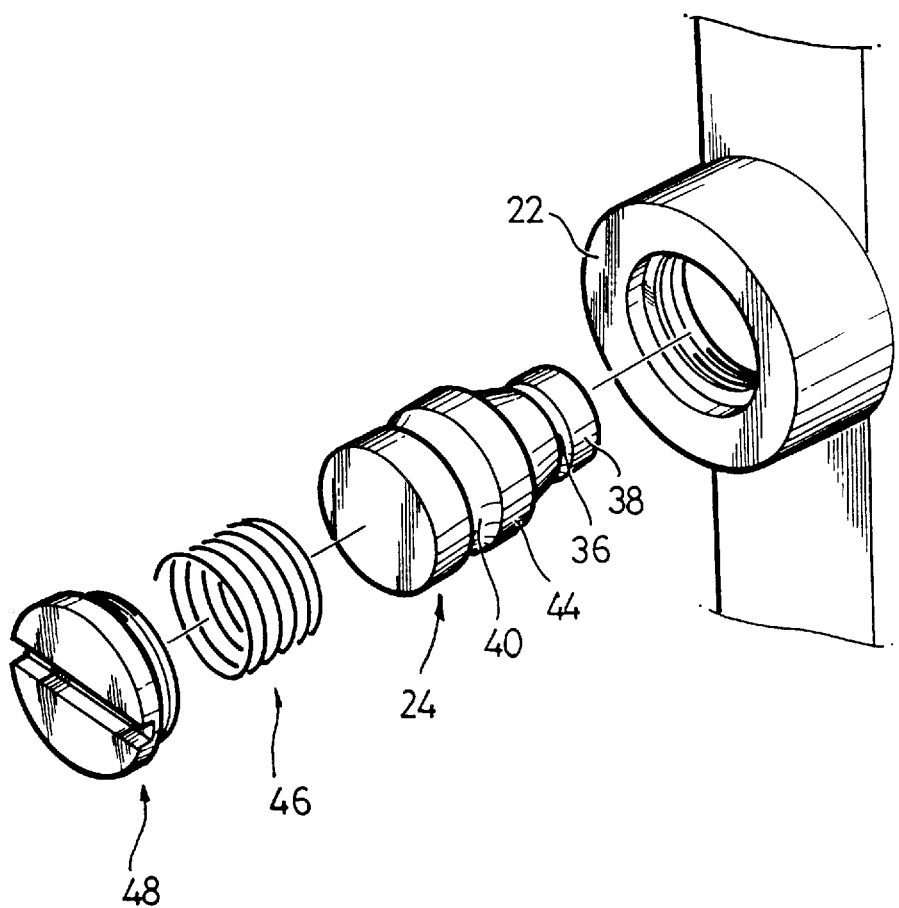
FIG. 2 is an exploded perspective view showing major parts of a shock absorber according to a preferred embodiment of the present invention.
Figure 3:
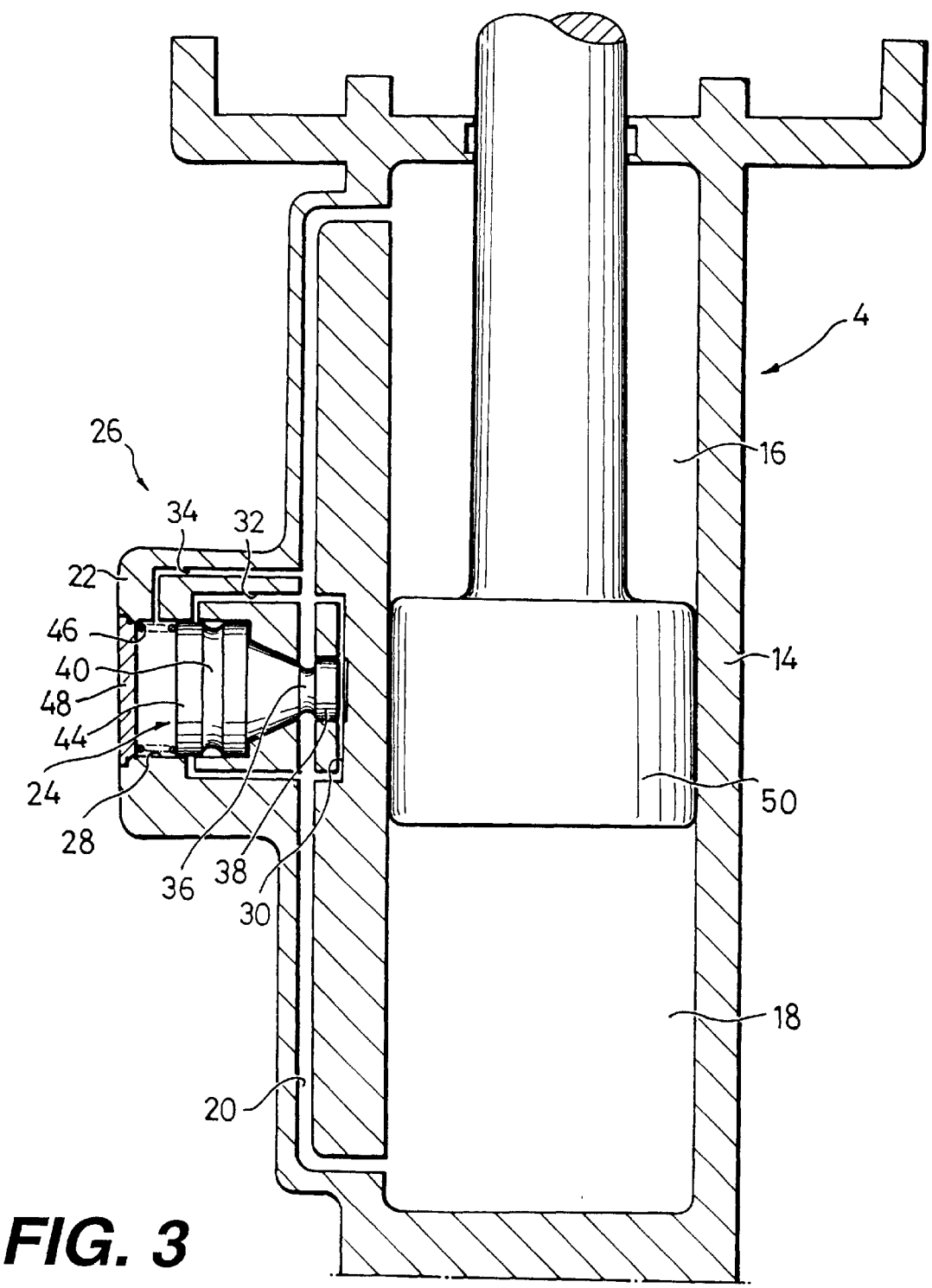
FIG. 3 is a sectional view of a shock absorber according to a preferred embodiment of the present invention.

That is, as shown in FIGS. 2 and 3, the shock absorber 4 comprises a cylinder having first and second hydraulic fluid chambers 16 and 18 which are divided by a piston 50. The first and second hydraulic fluid chambers 16 and 18 communicate with each other through a first hydraulic fluid passage 20 formed on one side of the cylinder 14. And a valve 26 is integrally formed on the cylinder such that is disposed on the first hydraulic fluid passage 20, the valve 26 having a valve body 22 and a valve spool 24.

The valve body 22 extends in a vertical direction with respect to the cylinder 14, and is provided with a valve chamber 28 formed along the vertical direction. The valve chamber 28 has a large inner diameter portion on the distal portion from the cylinder and a small inner diameter portion on the proximal portion from the cylinder. Accordingly, the valve spool 24 is disposed on the valve chamber and has a shape corresponding to the inner diameter of the valve chamber 28.

A first bypass fluid passage 30 is provided on the inner end of the valve body 22 to bypass the first fluid passage 20 therethrough and a second bypass fluid passage 32 is formed on the valve body 22 to bypass the first fluid passage 20 through the valve chamber 28. Further a second fluid passage is further provided on the valve body 22 to connect the first fluid passage 20 to the valve chamber 28.

The opening area of each bypass fluid passage is designed to be smaller than that of the first fluid passage 20 to increase flowing resistance of the fluid passing through the first and second bypass fluid passages 30 and 32.

The valve spool 24 disposed in the valve chamber 28 is provided with a first land 38 having a first circumferential fluid passing groove 36 and a face on which hydraulic fluid flowing along the first bypass passage 30 acts, and a second land 44 having a second circumferential fluid passing groove 40 and a face on which hydraulic fluid flowing along the second fluid passage 34 acts.

The valve spool 24 is biased by an elastic member 46, one end of which biases the face of the second land 44 and the other end of the which biases a cap 48, which is screw coupled on the valve chamber 28.

Accordingly, the valve spool 24 maintains its urged position toward the cylinder 14 of the shock absorber 4 in a normal state.

When applying the shock absorber to a front wheel side of a practical vehicle, the shock absorber is disposed such that the valve 26 faces towards the front side of the vehicle body. And, when applying the shock absorber to a rear wheel side of a practical vehicle, the shock absorber is disposed such that the valve 26 faces towards the rear side of the vehicle body.

Operation of the shock absorber will now be described. First, in a normal state, as shown in FIG. 3, the valve spool 24 is urged by the elastic member toward the cylinder 4, such that the first fluid passage 20 is opened by the first circumferential fluid passing groove 36.

Accordingly, the shock absorber 4 dampens the vibrations while normally operating.

Figure 4:
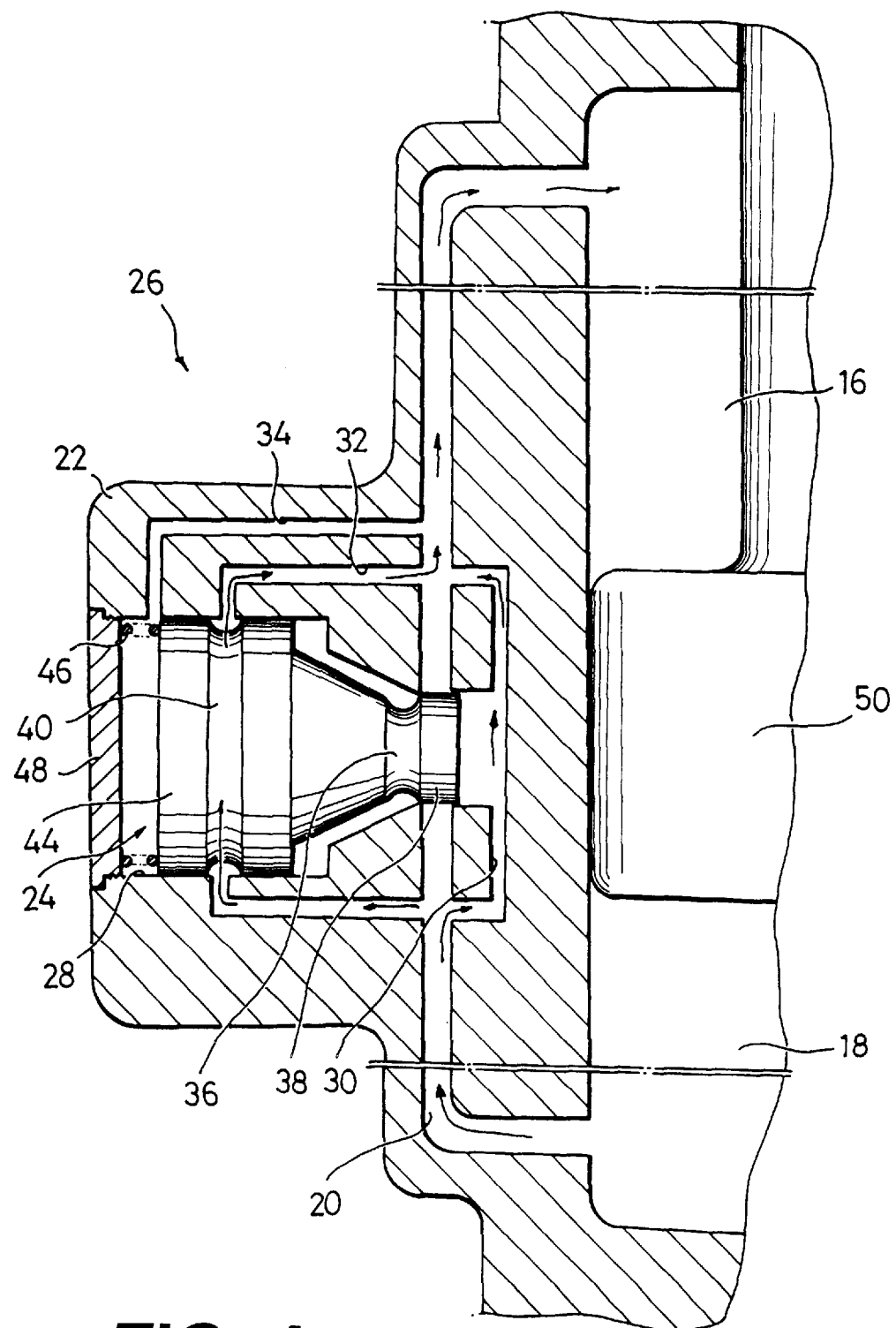
FIG. 4 is a view showing an operation state of a shock absorber according to a preferred embodiment of the present invention.
Figure 5:
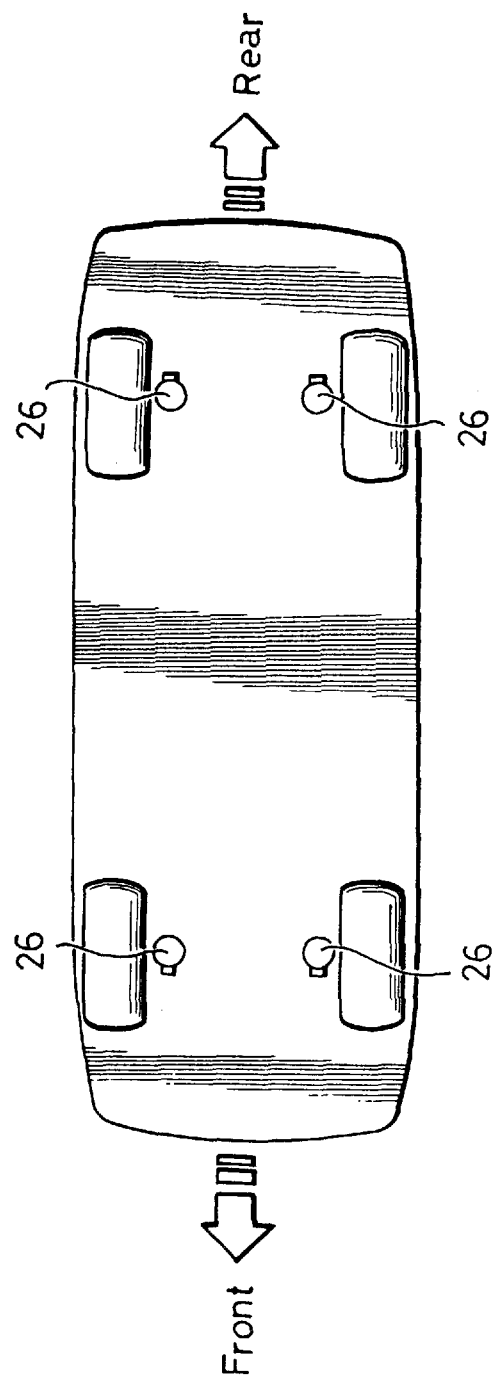
FIG. 5 is a view showing the vehicle shock absorber as it is applied.

When the front end of the vehicle body dives by abrupt braking force, as shown in FIG. 4, the piston 50 descends along the cylinder 14 and, at the same time, the valve spool 24 is displaced toward the left in the drawing by inertia force of the valve spool 24 while overcoming the elastic force of the elastic member 46.

And then, the hydraulic pressure within the second hydraulic pressure chamber 18 is increased and is fed to the first hydraulic fluid passage 20. However, at this point, since the first hydraulic fluid passage 20 is closed by the first land 38 while the first and second bypass fluid passages 30 and 32 are opened, the hydraulic pressure is increased through the bypass fluid passages 30 and 32. At this point, since each opening area of the first and second bypass passages 30 and 32 are smaller than the first hydraulic fluid passage 20, the flowing resistance becomes larger so that the damping effect with respect to the descending of the piston 50 is maximized, resulting in minimizing the vehicle's dive and squat.

During this operation, the leftwarded state of the valve spool 24 is remained by hydraulic pressure flowing along the bypass fluid passage 30 and applied on the face of the first land 38.

On the contrary, when the rear end of the vehicle body squats by the sudden accelerating force, the shock absorber applied to the rear suspension operates in the same manner as described above, thereby minimizing the vehicle's dive and squat.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A shock absorber of an automotive suspension for preventing dive of the front and rear end of the vehicle body, comprising:

a piston:

a cylinder divided into first and second hydraulic fluid chambers by the piston;

a hydraulic fluid passage for communicating the first and second hydraulic fluid chambers with each other; and means for increasing flow resistance of fluid flowing in the hydraulic fluid passage when the front end of the vehicle body dives by sudden braking force or the rear end of the vehicle body squats by sudden accelerating force, thereby minimizing the vehicle's dive and squat;

wherein said means comprises a valve having a valve body vertically formed so as to be an integral part of the cylinder and a valve chamber formed within the valve body, and a valve spool disposed within the valve chamber and biased by an elastic member, the valve body being provided with at least one bypass fluid passage bypassing the hydraulic fluid passage and having a smaller passage diameter than that of the hydraulic fluid passage, whereby when the front or rear end of the vehicle body dives or squats by abrupt braking or accelerating force, the valve spool is displaced by inertial force such that the hydraulic fluid passage is closed and the bypass fluid passage is opened, whereby the fluid flows by descending action of the piston through the bypass fluid passage while increasing flowing resistance thereof to minimize the vehicle's dive and squat.

2. The shock absorber according to claim 1, wherein the valve is further provided with a hydraulic fluid passage connected with the valve chamber.

3. The shock absorber according to claim 2, wherein the valve spool comprises a first land having a first circumferential fluid passing groove and a face on which hydraulic fluid flowing along one bypass passage acts, and a second land having a second circumferential fluid passing groove and a face on which hydraulic fluid flowing along the other bypass passage acts.

* * * * *

UNITED STATES PATENT AND TRADEMARK OFFICE
CERTIFICATE OF CORRECTION

PATENT NO.: 5,803,482
DATED: September 8, 1998
INVENTOR: Ki-won KIM

It is certified that an error appears in the above-identified patent and that said Letters Patent is hereby corrected as shown below:

TITLE PAGE:

Item [75], in the Inventor, line 1, "Ki-Won" should read --Ki-won--.

IN THE CLAIMS:

Claim 1, col. 4, line 20, "piston:" should read --piston;--.

Signed and Sealed this

Fifteenth Day of December, 1998

*Attest:*

BRUCE LEHMAN

*Attesting Officer*  *Commissioner of Patents and Trademarks*